United States Patent
Kim

(10) Patent No.: US 6,947,183 B1
(45) Date of Patent: Sep. 20, 2005

(54) FACSIMILE MAIL BOX SERVICE SUBSCRIBER APPARATUS AND OPERATING METHOD THEREOF

(75) Inventor: Ju-Hwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 752 days.

(21) Appl. No.: 09/705,722

(22) Filed: Nov. 6, 2000

(30) Foreign Application Priority Data

Nov. 5, 1999 (KR) ................... 99-49004

(51) Int. Cl.$^7$ ............................................. H04N 1/00
(52) U.S. Cl. ................ 358/402; 358/404; 358/405; 358/539; 358/407; 358/400; 358/1.15
(58) Field of Search .............. 358/402, 404, 358/405, 539, 407, 400, 1.15

(56) References Cited

U.S. PATENT DOCUMENTS

| | | | | |
|---|---|---|---|---|
| 4,887,162 A | * | 12/1989 | Arai ............................ | 358/400 |
| 4,975,783 A | * | 12/1990 | Takaoka ..................... | 358/404 |
| 5,041,917 A | * | 8/1991 | Koshiishi .................... | 358/434 |
| 5,119,210 A | * | 6/1992 | Baba .......................... | 358/405 |
| 5,159,465 A | * | 10/1992 | Maemura et al. ........... | 358/405 |
| 5,173,786 A | * | 12/1992 | Nakagawa .................. | 358/405 |
| 5,548,781 A | * | 8/1996 | Huang ........................ | 710/11 |
| 5,898,763 A | * | 4/1999 | Azuma et al. .......... | 379/100.04 |
| 5,949,552 A | * | 9/1999 | Yoshida ...................... | 358/435 |
| 6,005,675 A | * | 12/1999 | Maeda et al. ............... | 358/442 |

* cited by examiner

*Primary Examiner*—Kimberly Williams
*Assistant Examiner*—Negussie Worku
(74) *Attorney, Agent, or Firm*—Fleshner & Kim, LLP

(57) ABSTRACT

A facsimile mail box service subscriber apparatus and its operating method are disclosed by which when the facsimile message is recorded, in case of a facsimile message in ECM, it is subject to the FCS checking to store a facsimile message with no error, while, in case of a general facsimile compressed message, it is converted to a facsimile image binary data and subject to an error checking to thereby store a facsimile message without an error. Therefore, it is easy to detect an error of the facsimile data and restore it, so that a reliable facsimile service can be provided. In addition, there is an effect that the facsimile data in a binary form is stored in the storing unit, so that it can be readily adopted to an applied field such as an Internet facsimile according to a construction of its system afterwards.

11 Claims, 4 Drawing Sheets

FACSIMILE MAIL BOX SERVICE SUBSCRIBER APPARATUS AND OPERATING METHOD THEREOF

BACKGROUND OF THE INVENTION

1. Field of the Invention

The present invention relates to a facsimile mail box service system, and more particularly to a facsimile mail box service subscriber apparatus and an operating method thereof.

2. Description of the Background Art

Generally, a facsimile mail box service apparatus receives a facsimile data through a PSTN from a facsimile terminal and stores it, and then transmits the facsimile data to a facsimile terminal of the other party.

The facsimile mail box service apparatus is able to transmit a document information to a plurality of terminals by one-time manipulation or set a time and automatically deliver the document information. In addition, even though the facsimile terminal of the other party is engaged, the user does not need to wait for it. And, in case of transmitting document information overseas, the user may choose a less-chargeable time zone relying on a time difference.

FIG. 1 is a schematic view showing a construction of a general facsimile mail box service network in accordance with a conventional art.

As shown in the drawing, in case that a facsimile terminal 1 transmits a facsimile data to a facsimile terminal 2, a PSTN switching center 4 receives the facsimile data transmitted from the facsimile terminal 1 through a PSTN 3 and transmits it to a facsimile mail box service subscriber apparatus 5. Upon receipt of the facsimile data, the facsimile mail box service subscriber apparatus 5 stores it in a storing unit.

Thereafter, when the facsimile data stored in the storing unit of the facsimile mail box service subscriber apparatus is to be transmitted to the destination facsimile terminal 2, the facsimile mail box service subscriber apparatus 5 transmits the facsimile data stored in the storing unit to the destination facsimile terminal 2.

FIG. 2 is a schematic block diagram of the general facsimile mail box service subscriber apparatus 5 in accordance with the conventional art.

As shown in the drawing, the facsimile mail box service subscriber apparatus 5 includes a CPU 11, a facsimile data storing unit connection unit 12, a buffer memory 13, a PCM highway matching unit 14, a facsimile controller 15, a memory 16, a facsimile modem 17, a synchronous processor 18 and a control board information exchange memory 19.

The CPU 11 controls the whole facsimile mail box service subscriber apparatus. The facsimile data storing unit connection unit 12 controls matching with a control board and an external storing unit. The buffer memory 13 buffers a data transmitted and received between itself and the external storing unit. The PCM (Pulse Code Modulation) highway matching unit 14 recognizes a facsimile message applied through a PCM highway, converts the corresponding facsimile message to an analog signal and transmits it to the facsimile modem 17.

The facsimile controller 15 processes a facsimile protocol and facsimile data. The memory 16 stores the facsimile data. The facsimile mode 17 processes the analog facsimile data applied from the PCM highway matching unit 14 on the basis of an ITU-T.4 protocol.

The synchronous processor 18 synchronizes the message data applied or transmitted through the PCM highway. The control board information exchange memory 19 informs the control board of the recording completion of the buffer memory 13 under the control of the CPU 11.

The operation of the facsimile mail box service subscriber apparatus constructed as described above will now be explained with reference to the accompanying drawings.

1) Recording Operation of the Facsimile Message (Receiving Operation)

The CPU 11 recognizes a facsimile message applied through the PCM highway matching unit 14 and informs the facsimile controller 15 of the receipt of the facsimile message through the facsimile data storing unit connection unit 12.

The facsimile controller 15 informs the facsimile modem 17 of the arrival of the facsimile message, and at this time, the PCM highway matching unit 14 receives a synchronous signal from the synchronous processor 18, converts the PCM signal applied through the PCM highway to an analog signal and transmits the analog signal to the facsimile modem 17.

The facsimile modem 17 processes the analog signal transmitted from the PCM highway matching unit 14 to restore it to a data according to the protocol recommended by the ITU-T.4, and the facsimile controller 15 reads the data restored by the facsimile modem 17, stores it in the memory 16 and records it in the buffer memory 13 through the facsimile data storing unit connection unit 12.

After the data is completely recorded in the buffer memory 13, the facsimile data storing unit connection unit 12 outputs an interrupt signal to the CPU 11 to inform of the completion of recording.

Then, the CPU 11 informs the control board of the recording completion of the buffer memory 13 through the control board information exchange memory 19, and the corresponding control board reads the data stored in the buffer memory 13 and stores it in an external storing unit.

2) Reproducing Operation of the Facsimile Message (Transmitting Operation)

The operation for transmitting the facsimile message is performed in the reverse order of the above-described recording operation.

However, in the operation of the facsimile mail box service, there may occur an error due to a communication line when the facsimile message is transmitted and received.

As for the conventional facsimile mail box service subscriber apparatus, in case where only an ECM (Error Correction Mode) function is used, that is, a selective matter of the ITU-T.30 protocol, to detect and restore an error as generated, the facsimile terminal of the other party also should have the ECM function as well. Therefore, if the facsimile terminal of the other party doesn't have the ECM function, it is not possible to detect and restore an error.

In addition, in the conventional facsimile mail box service subscriber, in case where a facsimile image binary data conversion algorithm is used to detect and restore an error as generated, much load is produced by software and real-time processing is not easy.

SUMMARY OF THE INVENTION

Therefore, an object of the present invention is to provide a facsimile mail box service subscriber apparatus which is capable of providing, with high reliability, various service such as error detection through analysis of an ECM, a selective matter of the ITU-T.30, and a binary data, and a corresponding correction and request for re-transmission, capable of storing a facsimile data in a binary form in a storing unit, and capable of being readily adopted to an applied field such as an Internet facsimile according to a construction of a system afterwards, and its operating method.

To achieve these and other advantages and in accordance with the purpose of the present invention, as embodied and broadly described herein, there is provided a facsimile mail box service subscriber apparatus including: an image memory for storing a facsimile image binary data; and a facsimile image data processor for receiving a coded facsimile data from a facsimile controller, reverse-coding the facsimile data to a binary data, storing it in the image memory and transmitting it to a buffer memory, and reading the facsimile image binary data recorded in the image memory, coding and storing it in a memory.

To achieve the above object, there is also provided a method for operating the facsimile mail box service subscriber apparatus including the steps of: discriminating the type of a facsimile message as received; detecting an error according to the discriminated type and storing the received facsimile message; discriminating a transmittal mode of the facsimile message to be transmitted; and converting the facsimile data according to the discriminated transmittal mode and transmitting it.

To achieve the above object, there is also provided a method for operating the facsimile mail box service subscriber apparatus including the steps of: discriminating whether a received facsimile data restored according to a protocol recommended by the ITU-T.4 is a data in ECM or a general facsimile compressed data; reverse-coding the general facsimile compressed data to a binary form in case that the received and restored facsimile data is a general facsimile compressed data, and detecting whether there is an error with it; restoring an error if the error is detected and storing a facsimile image binary data in a good condition in an image memory; and recording the facsimile image binary data stored in the image memory in the buffer memory, and recording the facsimile image binary data of the buffer memory in a storing unit when the recording is completed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
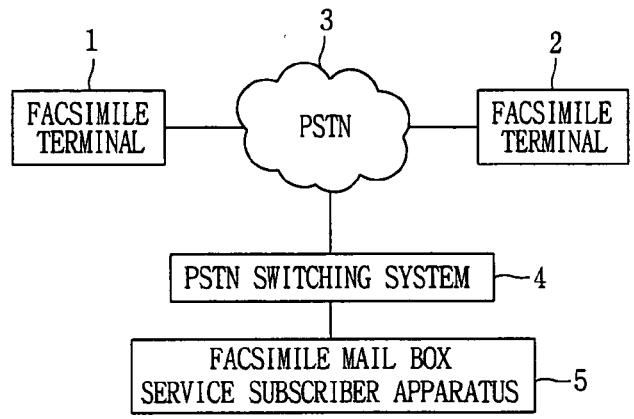
FIG. 1 is a schematic view showing a construction of a general facsimile mail box service network in accordance with a conventional art.
Figure 2:
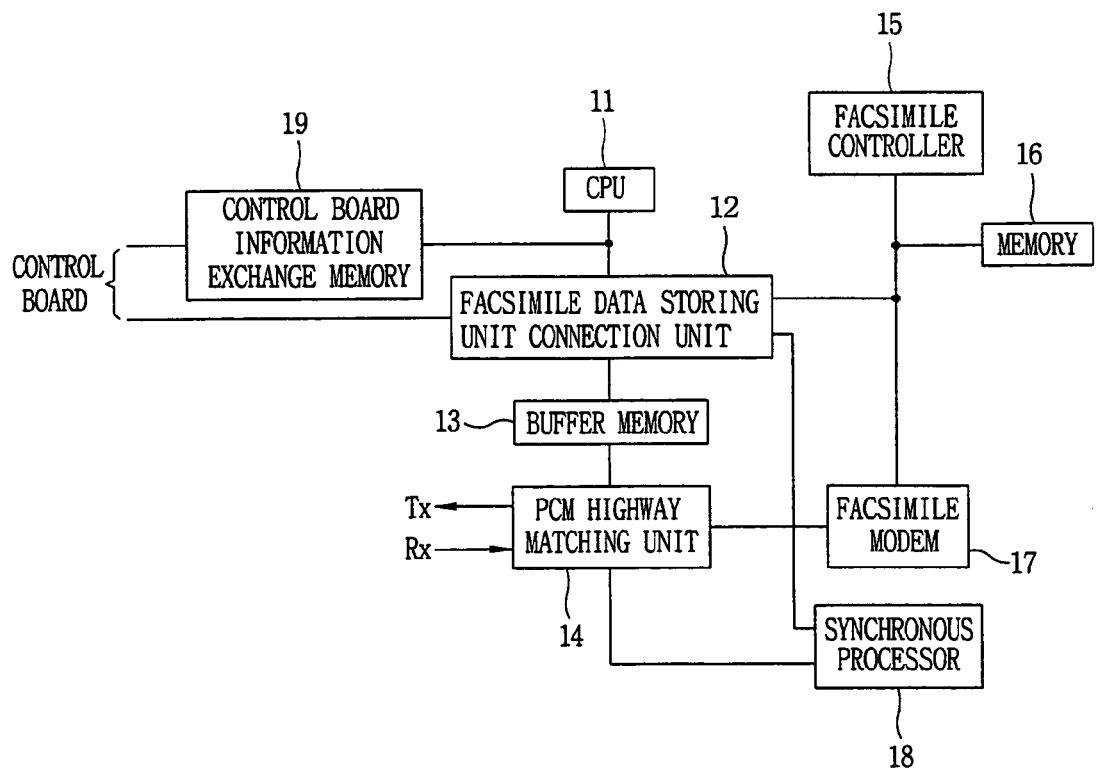
FIG. 2 is a schematic block diagram of the general facsimile mail box service subscriber apparatus in accordance with the conventional art.
Figure 3:
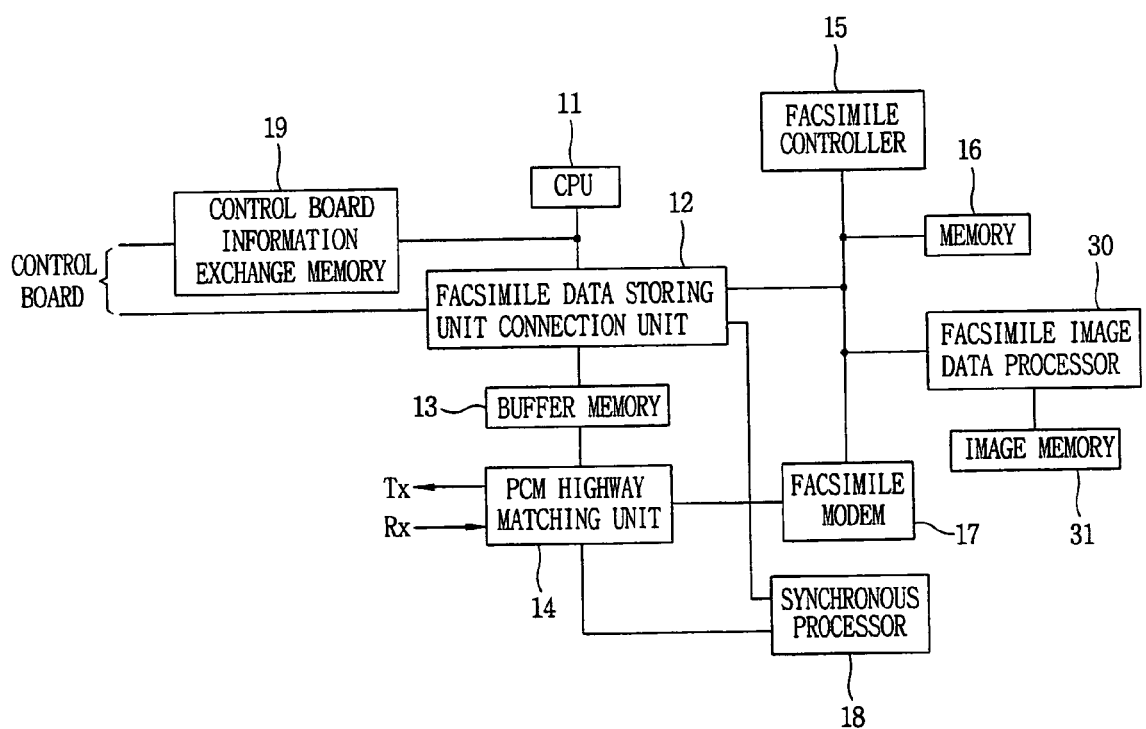
FIG. 3 is a schematic block diagram of a facsimile mail box service subscriber apparatus in accordance with the present invention.

FIG. 3 is a schematic block diagram of a facsimile mail box service subscriber apparatus in accordance with the present invention, which additionally includes a facsimile image data processor 30 and an image memory 31 into the conventional facsimile mail box service subscriber apparatus of FIG. 1.

The same reference numerals are given to the same elements as in the conventional art.

The facsimile image data processor 30 decodes a general facsimile compressed data, that is a facsimile data that has been coded according to the recommendation of the ITU-T.4, applied from the facsimile controller 15 into a binary data, stores it in the image memory 31 and transmits it to the buffer memory 13.

In addition, the facsimile image data processor 30 reads the facsimile image binary data recorded in the image memory 31, and codes the read facsimile image binary data according to the ITU-T.30 and stores it in the memory 16.

The image memory 31 stores the facsimile image binary data applied from the facsimile image data processor 30 and the facsimile image binary data stored in the buffer memory 13.

Figure 4:
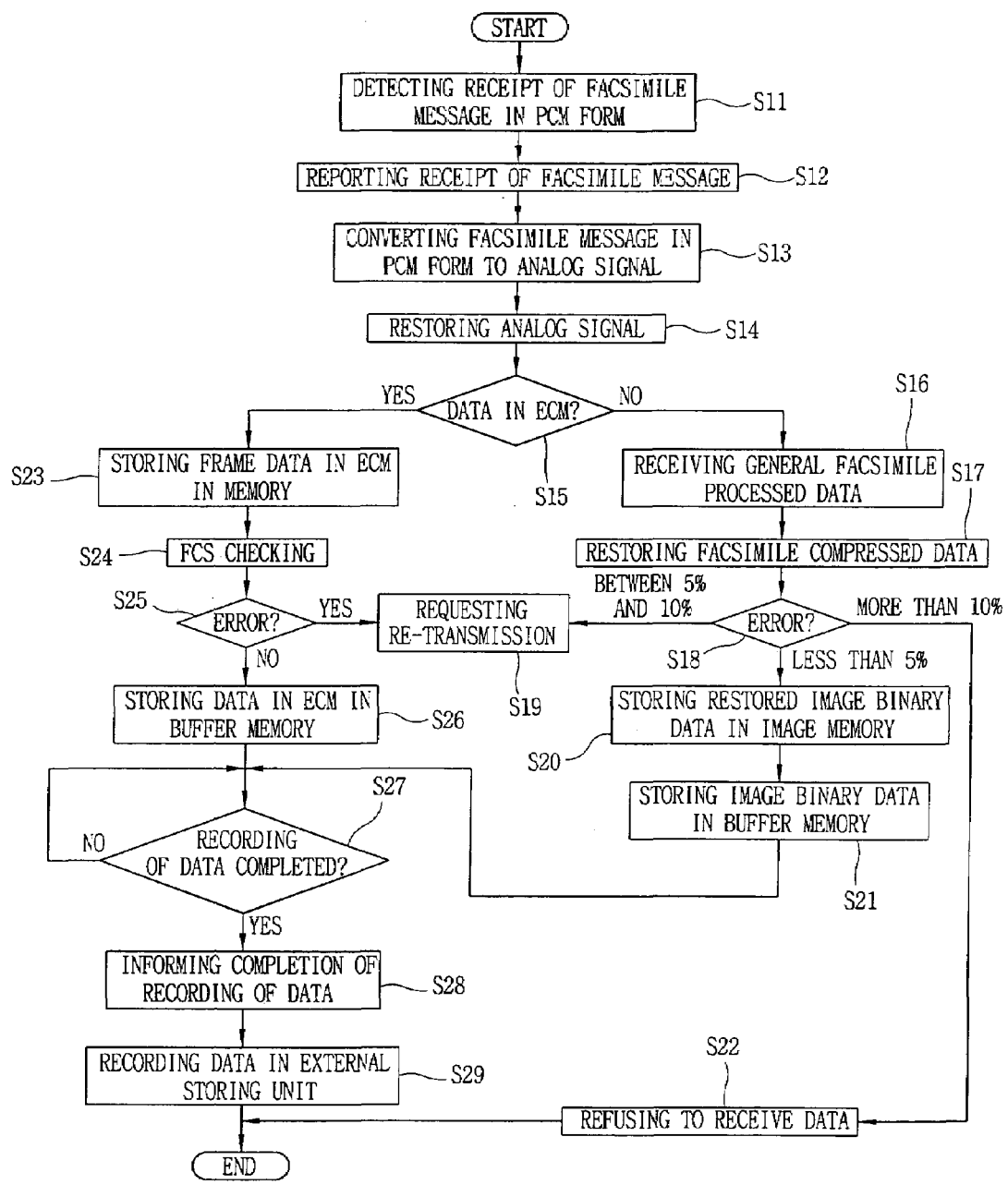
FIG. 4 is a flow chart of a method for receiving a facsimile message of the facsimile mail box service subscriber apparatus in accordance with the present invention.
Figure 5:
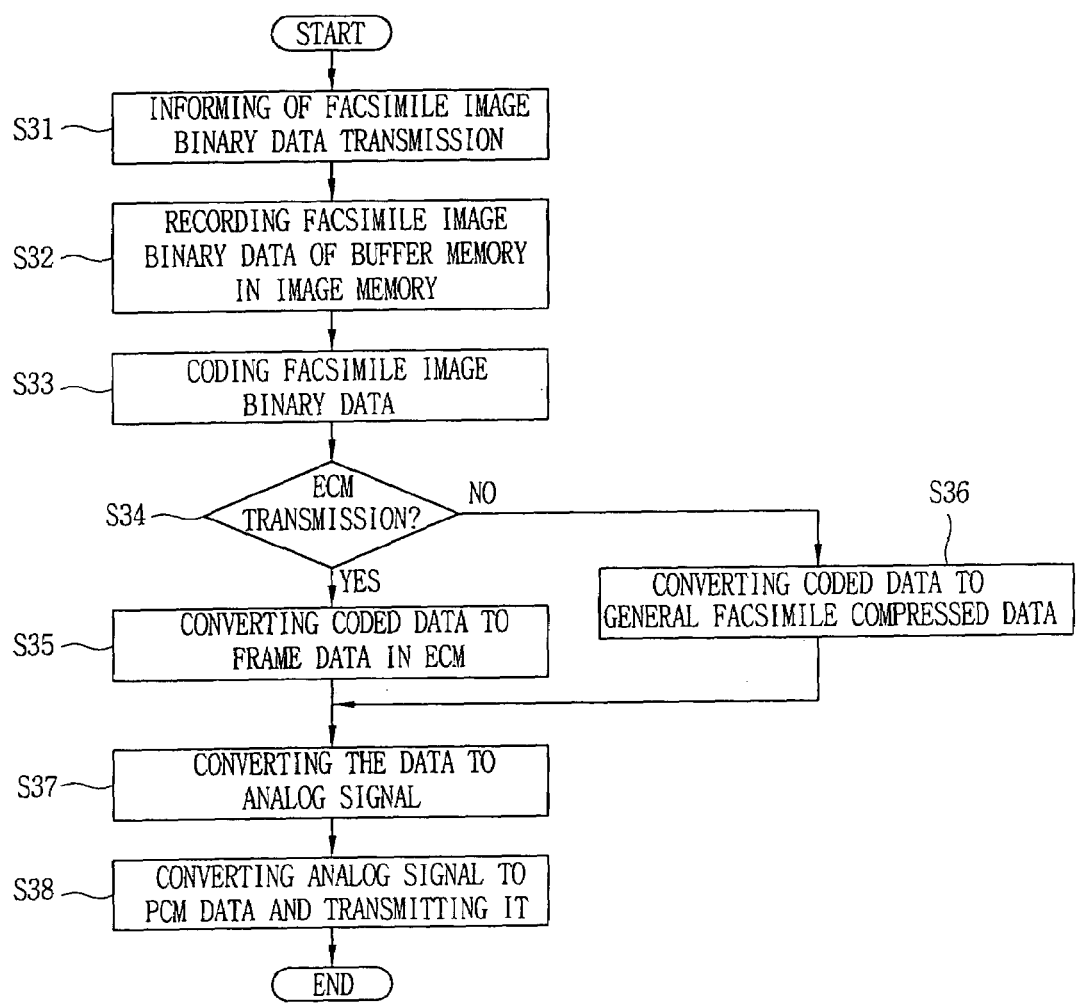
FIG. 5 is a flow chart of a method for transmitting a facsimile message of the facsimile mail box service subscriber apparatus in accordance with the present invention.

The method for operating of the facsimile mail box service subscriber apparatus in accordance with the present invention will now be described with reference to FIGS. 4 and 5.

1) The operation of recording the facsimile message transmitted from a PSTN switching system in the facsimile mail box service subscriber (The receiving operation):

When the CPU 11 detects a facsimile message in a PCM form inputted from the PCM highway matching unit 14 (S11), it informs the facsimile controller 15 of the receipt of the facsimile message through the facsimile data storing unit connection unit 12. Then, the facsimile controller 15 informs the facsimile modem 17 of the receipt of the facsimile message (S12).

At this time, the PCM highway matching unit 14 receives a synchronous signal from the synchronous processor 18, converts a facsimile message in a PCM form inputted through the PCM highway to an analog signal and transmits the analog signal to the facsimile modem 17 (S13).

The facsimile modem 17 restores the analog signal transmitted from the PCM highway matching unit 14 according to the protocol recommended by the ITU-T.4 (S14). The facsimile controller 15 reads the data restored by the facsimile modem 17 and discriminates whether it is a data in ECM (S15).

If the read facsimile data is a data in ECM, the facsimile controller 15 stores the read facsimile data in ECM in the memory 16 (S23). Thereafter, the facsimile controller 15 checks a FCS (Frame Check Sequence) for the stored data in ECM (S24).

Upon checking, if no error is detected, the facsimile controller 15 transmits the data in ECM to the facsimile image data processor 30, and the facsimile image data processor 30 records the transmitted data in ECM in the buffer memory 13 through the facsimile data storing unit connection unit 12 (S25, S26).

Meanwhile, upon checking, if an error is detected, the facsimile controller 15 requests the PSTN switching system 4 to re-transmit the facsimile message (S19).

Meanwhile, if a facsimile data read in the controller 15 is a general facsimile compressed data, the facsimile controller 15 directly transmits the general facsimile compressed data as read to the facsimile image data processor 30, not passing through the memory 16 (S16).

The facsimile image data processor 30 restores the general facsimile compressed data transmitted from the facsimile controller 15 to a binary data (S17) and checks whether there is an error with it according to an MMR (Modified Modified READ) decoding method on the basis of the recommendation of the ITU-T. 30 (S18).

Upon checking, in case that its error rate is more than 10% (a rate set to judge a refusal of receiving), the facsimile image data processor 30 refuses to receive the corresponding data (S22). In case that its error rate is between 5% (a rate set to judge that data is good) and 10%, the facsimile image data processor 30 requests of re-transmitting of the corresponding data (S19). Meanwhile, in case that its error rate is less than 5%, the facsimile image data processor 30 stores the restored facsimile image binary data in the image memory 31 (S20). Consequently, only the facsimile image binary data with no error or only a facsimile image binary data in a good condition is stored in the image memory 31.

And then, the facsimile image data processor 30 reads the facsimile image binary data stored in the image memory 31 and records it in the buffer memory 13 through the facsimile data storing unit connection unit 12 (S21).

While the facsimile data is being stored in the buffer memory 13, the facsimile data storing unit connection unit 12 identifies whether the data is completely recorded in the buffer memory 13.

When the data is completely recorded, the facsimile data storing unit connection unit 12 outputs an interrupt signal to the CPU 11 to inform of the recording completion (S27, S28). And, the CPU 11 informs the control board that the data has been completely recorded in the buffer memory 13 through the control board information exchange memory 19. Accordingly, the corresponding control board reads the data stored in the buffer memory 13 and stores it in the external storing unit (S29).

As described above, in the present invention, when the facsimile message received from the PSTN switching system is stored in the facsimile mail box service subscriber apparatus, in case of the facsimile message in ECM, it is subject to the FCS checking to store a facsimile message with no error, while, in case of a general facsimile message, other than the message in ECM, it is converted to a facsimile image binary data and subject to an error checking, so that only a facsimile message with no error is stored.

2) The operation of reproducing a facsimile message that has been recorded in the facsimile mail box service subscriber apparatus (That is, a transmitting operation) will be described with reference to FIG. 5.

The CPU 11 receives a message that there is a facsimile data to be transmitted in the buffer memory 13 from the control board through the control board information exchange memory 19 (S31). Upon receipt of it, the CPU 11 records the facsimile image binary data of the buffer memory 13 in the image memory 31 (S32).

Then, the facsimile image data processor 30 reads the facsimile image binary data recorded in the image memory 31, codes it according to the protocol recommended by the ITU-T.30 and stores it in the memory 16 (S33).

At this time, the facsimile image data processor 30 identifies whether the coded compressed data is to be transmitted in ECM (S34).

In case that the coded compressed data is to be transmitted in ECM, the facsimile image data processor 30 converts the coded compressed data to a frame data in ECM and transmits it to the facsimile modem 17. Meanwhile, in case that the coded compressed data is to be transmitted in a general facsimile compressed mode, rather than in ECM, the facsimile image data processor 30 converts it into a general facsimile compressed data and transmits it to the facsimile modem 17 (S35, S36).

Accordingly, the facsimile modem 17 converts the compressed data received from the facsimile image data processor 30 into an analog signal and transmits it to the PCM highway matching unit 14 (S37). Then, the PCM highway matching unit 14 receives a synchronous signal from the synchronous processor 18, converts the analog facsimile data to a PCM facsimile message and outputs it to the PSTN switching system (S38).

As so far described, according to the facsimile mail box service subscriber apparatus and its operating method of the present invention, when the facsimile message is recorded, in case of a facsimile message in ECM, it is subject to the FCS checking to store a facsimile message with no error, while, in case of a general facsimile compressed message, it is converted to a facsimile image binary data and subject to an error checking to thereby store a facsimile message without an error. Therefore, it is easy to detect an error of the facsimile data and restore it, so that a reliable facsimile service can be provided.

In addition, there is an effect that the facsimile data in a binary form is stored in the storing unit, so that it can be readily adopted to an applied field such as an Internet facsimile according to a construction of its system afterwards.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A method for operating a facsimile mail box service subscriber apparatus comprising:

discriminating whether a received facsimile message is an ECM (Error Correction Mode) compressed data or a general facsimile compressed data;

detecting an error by checking an FCS (Frame Checking Sequence) when the received facsimile data is the ECM data, and by performing an MMR (Modified Modified Read) method if the received facsimile data is the general facsimile data;

storing the ECM data or the general facsimile data as binary data if the error detected is below a first predetermined threshold:

converting the stored binary data to frame data if the stored binary is discriminated to be ECM data or converting the stored binary data to the general facsimile compressed data if the stored binary data is discriminated to be the general facsimile compressed data; and transmitting the converted data to a facsimile terminal.

2. The method according to claim 1, further comprising requesting a PSTN switching center to re-transmit the data, when the detected error is equal to or above the first predetermined threshold.

3. The method according to claim 1, further comprising:
decoding the general facsimile data to the image binary data by a facsimile image data processor;
refusing to receive the general facsimile data when an error rate of the data is larger than a second predetermined threshold that is greater than the first predetermined threshold, and performing a re-transmission request procedure when the error rate is larger than or equal to the first predetermined threshold and less than or equal to the second predetermined threshold, and storing the decoded image binary data in an image memory when the error rate is smaller than the first predetermined threshold; and
reading the facsimile image binary data from the image memory and storing the read binary data in a buffer memory by the facsimile image data processor.

4. A method for operating a facsimile mail box service subscriber apparatus comprising:
discriminating whether a received and restored facsimile data is a data in an ECM (Error Correction Mode) data or a general facsimile compressed data;
reverse-coding the general facsimile compressed data to a a facsimile image binary data when the received and restored facsimile data is the general facsimile compressed data, and detecting whether there is an error with the general facsimile compressed data;
restoring an error if the error is detected and storing the facsimile image binary data in an image memory; and
recording the facsimile image binary data stored in the image memory in a buffer memory, and recording the facsimile image binary data of the buffer memory in a storing unit when the recording is completed.

5. The method according to claim 4, wherein restoring the error comprises:
refusing to receive the received facsimile data when an error rate of the data is larger than a first predetermined threshold;
performing a re-transmission request procedure when the error rate is is smaller than or equal to the first predetermined threshold and larger than or equal to a second predetermined threshold that is smaller than the first predetermined threshold; and
storing the reverse-coded facsimile image binary data in the image memory when the error rate is smaller than the second predetermined threshold.

6. The method according to claim 4, further comprising:
storing the received and restored facsimile data in a memory and checking whether there is an error by checking a Frame Checking Sequence (FCS) when the received and restored facsimile data is the ECM data; and
storing the ECM facsimile data in a buffer memory when no error is detected.

7. The method according to claim 4, further comprising:
reading the facsimile image binary data from the buffer memory and recording the data in the image memory, when the buffer memory has the facsimile image binary data;
reading the facsimile image binary data from the image memory and coding the data; and
identifying a transmittal mode of the coded data, converting the coded data to a corresponding data form according to the transmittal mode, and transmitting the converted data.

8. The method according to claim 7, further comprising:
converting the coded data to a frame data in the ECM in when the transmittal mode is identified as the ECM; and
converting the coded data to the general facsimile compressed data form when the transmittal mode is not identified as the ECM.

9. A facsimile mail box service subscriber apparatus having a facsimile controller for processing a facsimile protocol and a facsimile data, a buffer memory for storing data to be received and transmitted from and to an external unit, and a memory for storing the facsimile data, comprising:
an image memory for storing a facsimile image binary data; and
a facsimile image data processor for receiving a coded facsimile data from a facsimile controller, reverse-coding the facsimile data to a binary data, storing the reverse-coded data in the image memory and transmitting the data to a buffer memory, and reading the facsimile image binary data recorded in the image memory, coding and storing the data in the memory.

10. A method for operating a facsimile mail box service subscriber apparatus comprising:
discriminating whether a received facsimile message is an ECM (Error Correction Mode) compressed data or a general facsimile compressed data;
detecting an error by checking an FCS (Frame Checking Sequence) when the received facsimile data is the ECM data, and by performing an MMD (Modified Modified Read) method if the received facsimile data is the general facsimile data;
storing the ECM data or the general facsimile data as binary data if the error detected is below a first predetermined threshold; and
converting the stored binary data to frame data if the stored binary is discriminated to be ECM data or converting the stored binary data to the general facsimile compressed data if the stored binary data is discriminated to be the general facsimile compressed data.

11. The method according to claim 10, further comprising:
decoding the general facsimile data to the image binary data by a facsimile image data processor;
refusing to receive the general facsimile data when an error rate of the data is larger than a second predetermined threshold that is greater than the first predetermined threshold, and performing a re-transmission request procedure when the error rate is larger than or equal to the first predetermined threshold and less than or equal to the second predetermined threshold, and storing the decoded image binary data in an image memory when the error rate is smaller than the first predetermined threshold; and
reading the facsimile image binary data from the image memory and storing the read binary data in a buffer memory by the facsimile image data processor.

* * * * *